(12) United States Patent
Sayers

(10) Patent No.: US 7,125,331 B1
(45) Date of Patent: Oct. 24, 2006

(54) SMALL GAME SKINNING AND CLEANING AID

(76) Inventor: Marty R. Sayers, 11549 N. Farm Rd. 101, Willard, MO (US) 65781

( * ) Notice: Subject to any disclaimer, the term of this patent is extended or adjusted under 35 U.S.C. 154(b) by 141 days.

(21) Appl. No.: 10/933,925

(22) Filed: Sep. 3, 2004

(51) Int. Cl.
*A22C 17/00* (2006.01)

(52) U.S. Cl. ..................................................... 452/189

(58) Field of Classification Search ............... 452/185, 452/187–191, 197; 294/142; 224/920, 921; 119/708, 467, 468, 51.03
See application file for complete search history.

(56) References Cited

U.S. PATENT DOCUMENTS

| | | | | |
|---|---|---|---|---|
| 1,311,779 A | * | 7/1919 | Shank | 452/189 |
| 2,931,629 A | * | 4/1960 | Keller | 254/409 |
| 3,188,130 A | * | 6/1965 | Pietrowicz | 294/74 |
| 4,243,164 A | | 1/1981 | Burlison et al. | 294/146 |
| 4,425,678 A | * | 1/1984 | Pepper | 452/187 |
| 4,502,418 A | * | 3/1985 | Runyan | 452/188 |
| 4,529,240 A | * | 7/1985 | Engel | 294/141 |
| 4,730,863 A | * | 3/1988 | Guadnola | 294/156 |
| 4,763,942 A | * | 8/1988 | Lyon | 452/192 |
| 5,901,999 A | | 5/1999 | Brock | 294/153 |
| 2001/0048230 A1 | | 12/2001 | Cornelius | 294/153 |

* cited by examiner

Primary Examiner—Thomas Price
(74) Attorney, Agent, or Firm—Jonathan A. Bay

(57) ABSTRACT

A small game skinning and cleaning aid that bears resemblance to a beam balance, or a mobile, has a beam that is suspended from a firmly tied-off top line. The beam extends between spaced outer retention points from where respective drop lines are retained. As well as having upper ends retained by the beam, the drop lines have lower ends that form self-tightening, readily un-tightened, nooses. A game animal is suspended by its hind paws, or fore paws, in the nooses. The upper ends of the drop lines are secured sufficiently fast to the beam in order to withstand the considerable pull of a user when stripping the pelt off the body in the manner of peeling off a sock. Yet the manner of securing the drop lines also allows their removal after use so that they can be washed of the soiling that results with use.

11 Claims, 2 Drawing Sheets

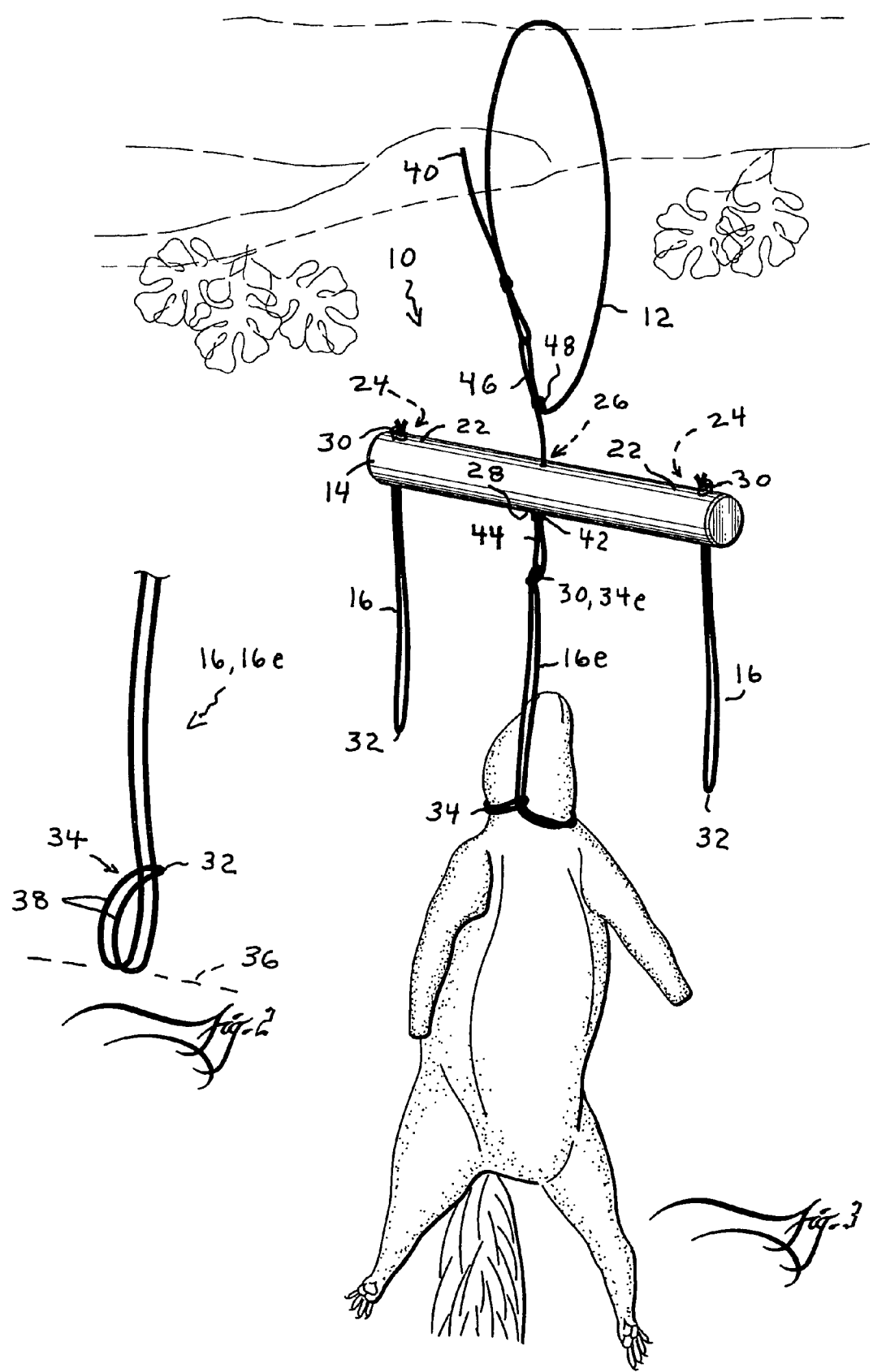

SMALL GAME SKINNING AND CLEANING AID

BACKGROUND AND SUMMARY OF THE INVENTION

The invention relates to animal butchering and, more particularly, to small game skinning and cleaning.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 2 is a perspective view of a limb line in accordance with the invention, two of which are shown by FIG. 1; and FIG. 3 is a perspective view comparable to FIG. 1 except showing a changed operative use such as more particularly for cleaning operations.

DETAILED DESCRIPTION OF THE PREFERRED EMBODIMENTS

Figure 1:
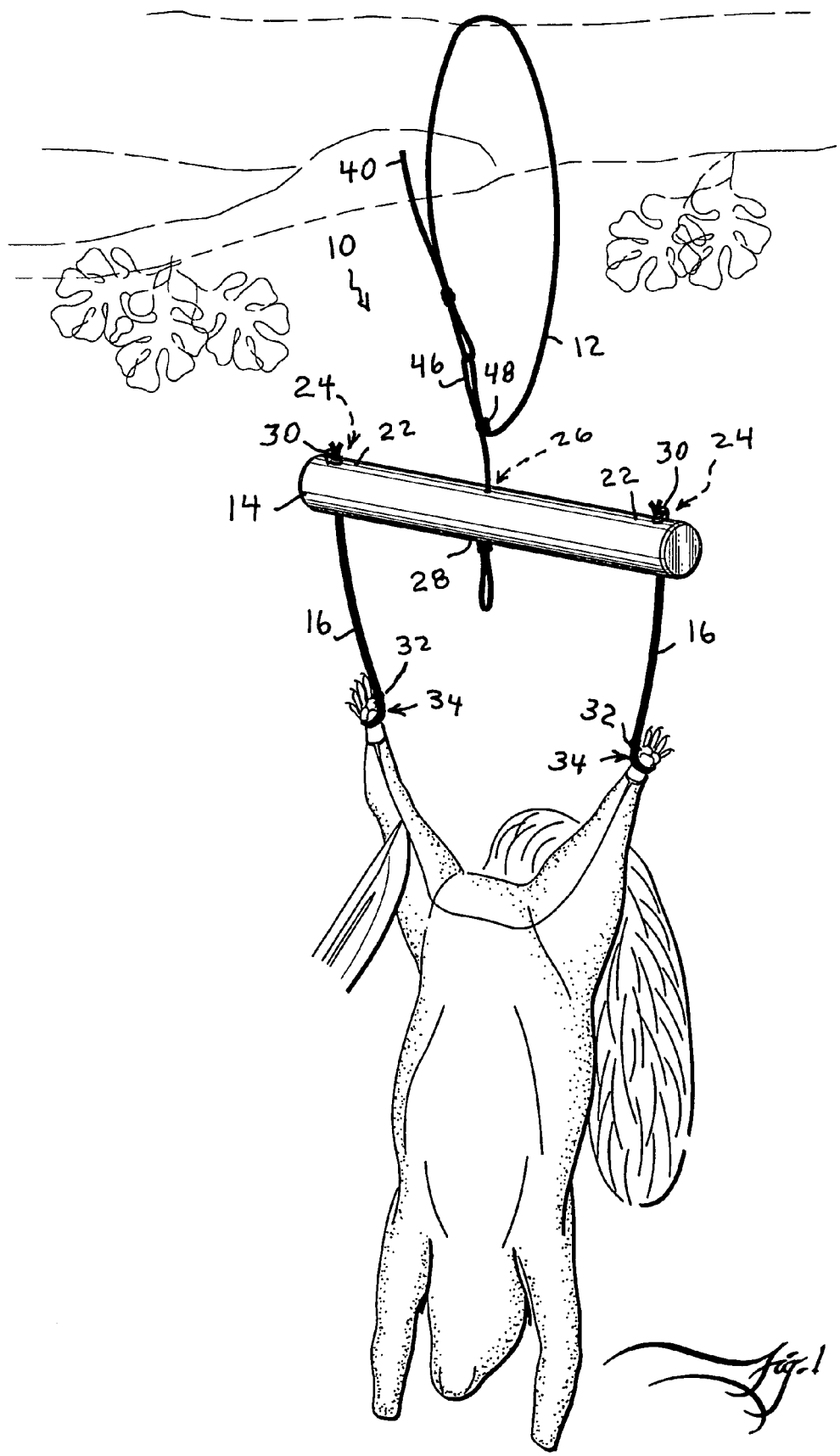
FIG. 1 is a perspective view of a small game skinning and cleaning aid in accordance with the invention, wherein a workpiece and an overhead support are included to show the operative use environment as more particularly for skinning operations.

FIGS. 1 and 3 are perspective views of a small game skinning and cleaning aid 10 in accordance with the invention. Although the inventive aid 10 is likely advantageous for about all small game, it is particularly advantageous for squirrels. As the experienced know, you have to be careful when removing a squirrel pelt lest you launch any loosed or shed squirrel hair off the pelt. That is, you'd like to remove the pelt with 100% of the strands of hair staying with it, and thereby keeping it all off any bare flesh. This is because if even one single strand of squirrel hair lands on the bared squirrel flesh, it is fiendishly difficult to wash off, or remove by any means. The more hair that does so only compounds the problem to extremes.

The inventive aid 10 bears some resemblance to a beam balance. It has a top line 12 for hanging a beam 14 from any readily available overhead support, as for example and without limitation a tree branch, as illustrated. As an aside, the term "overhead" as used here means no more than above ground, and not necessarily over the user's head because in fact a user may find it most comfortable if the overhead support is no higher than shoulder high to the user, which might put the beam 14 about chest high. That aside, there is a small preference that the top line 12 generally intersect the beam 14's center, or balance point. However, this is not absolutely critical. The beam 14 extends lengthwise between spaced outer ends. The regions of the beam 14 near each of the outer ends may be reckoned as, and merely for convenience in this written description, "shoulders" 22. Each shoulder 22 is formed with an outer through hole 24 that extends perpendicularly through the beam 14's lengthwise axis as well as extends generally co-planar with its counterpart in the opposite shoulder 22. By means of these outer through holes 24, the beam 14 carries a pair of removable drop or "limb" lines 16.

It is an aspect of the invention that the limb lines 16 are removable from the beam 14 because this importantly allows for better washing of soiled limb lines 16 after use. This is achieved by the following.

The line diameter of the limb lines 16 and the hole diameter of the outer through holes 24 are selected cooperatively such that doubled-up line-stock (eg., "courses") of a given limb line 16 drops snugly in its respective through hole 24. That is, the through holes will allow sliding passage of the doubled-up courses of the limb lines 16. That way, a suitable knot should stop further dropping as shown.

More particularly, preferably the limb lines 16 are produced from a single strand of line-stock which is bent in its middle to form a U-bend, lower terminus 32 and to bring the strand's two tag ends together for knotting together in a knot 30 to form the upper terminus. The preferred knot 30 includes without limitation a "water knot." To be particular, a water knot can be reckoned as an overhand knot tied with double courses of line. Briefly, the term "overhand knot" is conventionally reckoned as applicable to a knot tied out of a single strand (and therefore single course) of line. If a knot that appears like an overhand knot is formed except out of two side-by-side courses of line coursing through the knot (it not being a requirement that the courses are from the same strand or even of equal diameter), then this is referred to as a water knot. A water knot is unlike what is known as a "double overhand knot," which like a simple overhand knot is tied with a single strand (and, ie., course) except, in contrast to a simple overhand knot which is formed with a single coil, it is tied with two coils.

The advantages of a water knot include that it is easy to tie yet when tightened is durably tied and difficult to untie. Therefore, a firmly tightened water knot is a relatively permanent knot. The purpose knotting the tag ends of the limb line 16 strand together is to form very simply an enlargement, or stop, to stop the downward drop of the doubled-up limb line 16 strand on the shoulders 22 of the beam 14 as shown. FIG. 3 shows the appearance of the outer limb lines 16 when installed in place but unused. Each drops slack more or less straight down, terminating at the bottom in the U-bend lower terminus 32.

FIG. 2 shows that this U-bend 32 can be readily manipulated into forming a noose 34 commonly referred to as a "Lark's spur" noose. To form the Lark's spur noose 34, a user simply grabs the terminal U-bend 32 of the straightened limb line 16 (eg., straight as shown in FIG. 3), and folds up the doubled courses up at fold axis indicated in FIG. 2 by reference numeral 36. At first, the user finds that he or she has produced twin lobes 38 extending oppositely sideways from each other (this opposite extension is not shown). All that remains to be done is to bring the two lobes 38 together such that the terminal U-bend 32 wraps around upper sections of the double-course limb line 16, the result of which is a double-course Lark's spur noose 34 as shown by FIG. 2. Having gotten this far, then all the user has to do is project any target appendage of the animal through the noose 34 and cinch the slack out. In fact, Lark's spur nooses 34 are self-tightening under the free weight of a suspended mass, such as the small game animal.

Accordingly, the preferred knot for forming the bottom nooses is a Lark's spur because, in addition to being self-tightening under the weight of the suspended mass, it also readily loosens up or unties. Needless to say, loosening the Lark's spur noose 34 does require lifting the mass of the animal so as to relieve tension. However, small game by definition are small, and lightweight. The strength of a child is sufficient. Whereas the Lark's spur noose 34 is preferred, it is not preferred to the exclusion of any other suitable noose which unties fairly readily.

To resume in FIG. 1, preferably the top line 12 is produced from a single strand of line-stock. The beam 14, preferably constructed from without limitation wood dowel stock, is correspondingly formed with a central through hole 26 for through-extension of the top line 14. Like the outer through holes 24, the central through hole 26 is preferably formed perpendicularly to the lengthwise axis of the beam 14 and co-planar with the outer through holes 24. Unlike the outer through holes 24, the central through hole 26 is preferably formed to allow the snug extension of only a single course of line-stock. Hence, if the same line-stock is used to produced all the lines 12 and 16 of the invention (which is preferred), then the central through hole 26 will typically have a smaller diameter.

Preferred line-stock for the invention includes without limitation braided nylon. It is strong, tough, yet knots easily and has good knot strength, as well as is lowly absorbent to blood and other biologic soiling and thus responds well to washing with soap or detergent. Strands of braided nylon can also be severed off from a bulk roll of supply stock with a hot knife in order to fuse tag ends and thus to prevent un-braiding, as well as will have relatively low stretch given the moderate lengths thereof, yet remain flexible.

Again, it is not critical that the central through hole 26 be located on precisely the vertical axis of balance for the system. Whereas the invention resembles in ways a mobile, the beam 14 need not hang perfectly balanced in a horizontal plane to provide useful service. With an animal suspended as shown by FIG. 1, the system will find its own equilibrium in any event. And besides, once a user starts to work on the animal, things are relatively free to gyrate. Even the overhead support may yield, especially limber boughs of trees or shrubs and the like.

The top line 16, if straightened vertically, generally extends between an upper tag end 40 and a lower tag end tied in a knot 42 that forms a loop 44. This knot 42 is tied to be a relatively permanent preferably by means of and without limitation a water knot, and in any case it operates as a lower stop knot 42 for abutting against a butt section 28 of the beam 14. When reckoned by its location, this loop 44 may be referred to as the lower loop 44. Above the lower stop knot 42, the top line 12 threads through the central hole 26 and some short gap above that, the top line 12 is formed with another relatively permanent knot 48, preferably by means of and without limitation another water knot, it operating as an intermediate stop knot 48. One preferred function of the intermediate stop knot 48 includes that it relatively permanently joins the top line 12 to the beam 14. Unlike the limb lines 16 which are readily removable for washing, it is not comparably preferred that the top line 12 be removable. Instead, it is preferred if the top line 12 and beam 14 remain relatively permanently joined as this protects better against separate loss of either if they were otherwise easily separable. This is achieved by threading the beam 14 between a pair of relatively permanent knots 42 and 48.

Another preferred function of the intermediate stop knot 48 is that it also provides a loop 46 which, when reckoned by its location, may be referred to as the intermediate loop 46. FIGS. 1 and 3 both show that this intermediate loop 46 affords a user a place to tie off the top line 12's upper tag end 40 for temporary securing to the overhead support. The drawings show the upper tag end 40 tied in another water knot for convenience of illustration. This is readily doable by a tying operation known as retracing an overhand knot. However, more practical knots for tying off the upper tag end 40 to the intermediate loop 46 would include either a Lark's spur or any of various hitches (none shown) because they untie more easily, especially if the hitches are tied where simply pulling on the upper tag end 40 unties the hitch. Users are free to tie any of their own favorite or familiar knots.

FIG. 3 shows a use for the lower loop 44. It is an aspect of the invention that a limb line 16 (or extra limb line 16*e* as shown) can be re-deployed (or deployed) in service as a Lark's spur noose 34 for the neck as shown. This extra limb line 16*e*'s upper knotted end 30 can be threaded to form a Lark's spur 34*e* cinched around the top line 12's lower loop 44. After that, the extra limb line 16*e*'s lower terminus can be formed in another, larger Lark's spur noose 34 for suspending the animal, which as shown here is by its neck.

As FIG. 3 shows, this is an extra limb line 16*e* or, that is, it is a third one to the other, outer two limb lines 16. Thus it is preferred if a complete set of limb lines 16 and 16*e* for the invention comprises a set of three. That way, the two outer limb lines 16 can be left in place as shown in FIG. 3, ready for the next animal, assuming the user has several to do on a given occasion. It is also preferred if all three limb lines 16 and 16*e* are produced to the same specification, and are therefore interchangeable with each other from one use occasion to the next. And significantly, it is an aspect of the invention that the limb line 16*e* deployed in the center as a neck noose is as readily removable as the outer two limb lines 16, for the same reasons, namely, for washing the soiled limb line 16*e* after use.

The advantages of the invention might be more readily apparent when its method of use is described, as follows and with reference to FIG. 1. Preliminarily, it would help if the user knew a secret of the craft of skinning and cleaning small game (or at least squirrels), which is, it pays to soak the animals ahead of time in water, and thoroughly, as completely submerged. The reason to soak the fur is that this reduces the risk of loose or shed hair finding its way stuck to the bare flesh. The user would be well advised to do so, as by dispensing all of his or her harvest of the moment into a water tank. The shortest recommended soak time conveniently corresponds to the time it takes for the user to turn his or her attention to retrieving and hanging the inventive skinning and cleaning aid 10. The top line 12 serves an original purpose of allowing the user to fasten the inventive aid 10 to the overhead support.

Now, in consideration of one animal at a time, the user is advised (in no particular order) to take the knife and slice the pelt (and, as according to one's skill level, just the pelt and not but shallowly if at all into the flesh) to girdle both ankles as well as lop off the front paws at the wrists. The user may either slice the pelt's parting seam depicted in FIG. 1 at this stage or else suspend the animal in the inventive skinning and cleaning aid (FIG. 1 actually shows the user waiting to slice the parting seam for a later opportunity, as described below). Assuming the user chooses to suspend the animal first, the user readily achieves this by manipulating the outer limb lines 16 to form nooses 34 around the ankles, and preferably as by Lark's spurs nooses as shown (and as described above). Here is when, as illustrated in FIG. 1, the user has chosen to slice through the pelt from one girdle to the other in order to form the pelt's parting seam, which courses along the inside of the hind legs.

The next step is done by hand, and usually with both hands. A user peels away the pelt from the underlying flesh at the parting seam, perhaps first baring the flesh of the hind legs, working his or her way along until the pelt is being pulled down like a sock off the torso of the animal. However, at the tail, a special consideration needs to be taken into account. Early on, the pelt will both strip off the rump of the animal as well as at the same time strip off the stump of the tail. In squirrels, the stump of the tail is the portion that is still covered by the fur's short coat, and it's terminal boundary can be reckoned as more or less by where the long feathery hairs begin to flare out. So, once the user has bared a short portion of the stump, the user is advised to lop off the tail close to the body, preferably carefully so as to not pierce the pelt on the cut-off tail (or really anywhere from this stage on for that matter). From here, the user is advised to pull the rest of the pelt (with tail in tow) the rest of the way down the body to the head, and lop it off at the neck to be done with the skinning operation. The gullet of the squirrel can be cleaned to be nearly finished.

Needless to say, the top line 12, beam 14 and limb lines 16/16e are all preferably sufficiently strong, and secured sufficiently fast to a sufficiently sturdy overhead support, in order that the whole system can withstand the considerable pull of the user when he or she is stripping the pelt off the body in the manner of peeling off a sock.

An alternative way to skin and clean the animal is to do with it suspended by its neck, as described next and with reference to FIG. 3. The choice whether to attack the job this way or by the previously-described way might be influenced by how badly a hind paw or the pelt is shot up, such that there are foreseeable problems with stripping the pelt as previously described. By this alternative way, the user is advised to attach the extra limb line 16e to the lower loop 44 (if not already earlier taken care of, as shown by FIG. 3).

Preliminarily, the user is advised to lop off the front paws and then girdle the pelt around the body of the animal, for example the chest, to form a parting seam. Then the animal is suspended from the extra limb line 16e by its neck as shown. With both hands, the user is advised to peel the hind half of the pelt down, lopping off the tail in the process, and tearing it clear from the hind paws. To get the rest of the pelt, the user is advised to extract the squirrel out of the neck noose 34 of the extra limb line 16e then re-hang it by its hind paws from the outer two limb lines 16 (or by only one good hind paw from the extra limb line 16e if that be the case). The fore half of the pelt is at this point peeled down to the head, which is where the user lops that off at the neck to be done with the skinning operation. As before, the gullet of the squirrel can be cleaned to be nearly finished.

By either way, to be completely finished, the user lops off the hind paws. The foregoing operations can be repeated over as many times as it takes upon any given occasion to skin and clean a harvest of animals. Once the use of the invention is over for that given occasion, it is strongly recommended that the soiling from the skinning and cleaning be washed. Generally, the soiling or at least the heavy soiling will be confined to the limb lines 16 and 16e. All the limb lines 16 and 16e—all three that is if the extra one was also deployed—are readily removable for washing. The limb lines 16 and 16e can even be thrown in an automatic washing machine, presumptively on an occasion when the load of laundry includes not the family's finest clothes but the hunting party's similarly soiled hunting clothes.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A small game skinning aid comprising:
   an elongated beam having a center portion flanked between two shoulder portions;
   a top line extending between an upper end adapted for forming a firm, upper fastening to a sturdy overhead support and a lower end that is cooperatively adapted along with the beam's center portion for a firm, lower fastening therebetween;
   two drop lines, each extending between a lower terminus and an upper terminus that is cooperatively adapted along with a respective shoulder portion for a firm fastening therebetween;
   wherein each drop line is produced from a given strand of line-stock to form doubled-up courses of the given strand for at least the lower terminus as well as proximal portions extending up therefrom such that the lower terminus is defined by a terminal U-bend and so that in consequence the lower terminus as well as the doubled-up course proximal portions extending up therefrom can be manipulated into forming a Lark's spur noose for cinching onto chosen anatomy of a small game animal, including an ankle, wrist, or neck; and
   wherein the top line's lower end and the beam's center portion are further cooperatively adapted together such that the top line's lower end is tied into a knot as the center portion is formed with a generally vertical through hole that is sized to snugly surround the top line as well as is sized to block lower end's knot and stop the top line from losing the beam in response to application of considerable downward pulling force.

2. The small game skinning aid of claim 1 wherein:
   each upper terminus and the respective shoulder portion therefor are further cooperatively adapted together to form a user-selectively unfastening, firm fastening therebetween such that, after soiling from use, the drop lines can be selectively unfastened for removal and washing apart from the beam and top line.

3. The small game skinning aid of claim 1 wherein:
   each given strand extends between first and second tag ends, and each drop line is further produced such that the given strand thereof is bent at the middle to define the terminal U-bend and in order to bring the first and second tag ends together, which in order to form the upper terminus are tied in a knot; and
   the respective shoulder portion thereof is formed with a generally vertical through hole that is sized to allow snug passage of the lower terminus and doubled-up courses proximal portions extending up therefrom as well as is sized to block the knot and stop the drop line from pulling out in response to application of considerable downward pulling force, wherein the drop lines can be readily withdrawn out the top of the holes in the shoulder portions after use for ready removal and washing apart from the beam and top line.

4. The small game skinning aid of claim 3 wherein:
   wherein the knots used to form the upper terminuses comprise water knots.

5. The small game skinning aid of claim 1 wherein:
   the lower end's knot is tied to produce a relatively permanent loop underneath the beam.

6. The small game skinning aid of claim 5 further comprising:

an extra drop line, produced from a selected strand of line-stock that extends between opposite tag ends, and further produced such that the selected strand is bent at the middle to form a U-bend termination and in order to bring the opposite tag ends together, in order to knot together form a knotted termination, wherein the knotted termination can be manipulated to form a Lark's spur fastening to the top line's loop underneath the beam and the U-bend termination can be manipulated to form a Lark's spur noose for cinching onto chosen anatomy of the small game animal, including the ankle, wrist, or neck;

wherein the Lark's spur fastening and noose can be readily undone even after tightening during use for ready removal and washing of the extra drop line after use, apart from the beam and top line.

7. The small game skinning aid of claim 5 further comprising:

an endless band of line-stock, wherein one portion of the endless band can be manipulated to form a Lark's spur fastening to the top line's loop underneath the beam and a relatively diametrically opposite portion of the endless band can be manipulated to form a Lark's spur noose for cinching onto chosen anatomy of the small game animal, including the ankle, wrist, or neck;

wherein the Lark's spur fastening and noose can be readily undone even after tightening during use for ready removal and washing of the endless band after use, apart from the beam and top line.

8. The small game skinning aid of claim 5 wherein:

the lower end's knot comprises a water knot.

9. The small game skinning aid of claim 5 wherein:

the top line has an intermediate portion closely gapped above the beam's center portion that is bent and tied in a knot that the center portion's through hole blocks to prevent the top line's upper end from pulling out therethrough, as well as to produce a relatively permanent loop above the beam;

wherein the top line's loop above the beam affords the top line's upper end a fastening opportunity for forming the firm, upper fastening to the sturdy overhead support, including tree branches.

10. The small game skinning aid of claim 9 wherein:

the intermediate portion's knot comprises a water knot.

11. The small game skinning aid of claim 5 wherein:

the top line has an intermediate portion closely gapped above the beam's center portion that is tied in a knot that the center portion's through hole blocks to prevent the top line's upper end from pulling out therethrough.

* * * * *